United States Patent [19]

Fock et al.

[11] Patent Number: 4,678,599

[45] Date of Patent: Jul. 7, 1987

[54] USE OF COPOLYMERS OF POLYOXYALKYLENE ETHERS OF ALLYL AND/OR METHALLYL ALCOHOL AND VINYL ESTERS AS DEMULSIFIERS FOR WATER-CONTAINING CRUDE OIL

[75] Inventors: Jürgen Fock, Düsseldorf; Hans Rott, Essen, both of Fed. Rep. of Germany

[73] Assignee: TH. Goldschmidt AG, Essen, Fed. Rep. of Germany

[21] Appl. No.: 665,029

[22] Filed: Oct. 26, 1984

[30] Foreign Application Priority Data

Oct. 27, 1983 [DE] Fed. Rep. of Germany ....... 3338923

[51] Int. Cl.$^4$ .................. B01D 17/04; C07C 69/66
[52] U.S. Cl. .................. 252/343; 252/358; 252/340; 560/189; 526/320
[58] Field of Search .................. 252/358, 340, 343; 560/189; 526/320

[56] References Cited

U.S. PATENT DOCUMENTS 2,626,924 1/1953 DeGroote .................. 252/343 X
4,364,777 12/1982 Grunert et al. .................. 252/358 X

FOREIGN PATENT DOCUMENTS 101267 2/1984 European Pat. Off. .
2727192 12/1977 Fed. Rep. of Germany .
143004 9/1976 Japan .
83984 4/1979 Japan .
2116205 9/1985 United Kingdom .

Primary Examiner—John F. Terapane
Assistant Examiner—Catherine S. Kilby
Attorney, Agent, or Firm—Toren, McGeady & Associates

[57] ABSTRACT

For demulsifying water containing crude oil, copolymers are used which are obtained by copolymerizing one or several polyoxyalkylene ether(s) of allyl and/or methallyl alcohol with vinyl esters of lower carboxylic acids or mixtures of vinyl esters of lower carboxylic acids with up to 50 mole percent of esters of acrylic or methacrylic acid or ethers of allyl or methallyl alcohol and fatty alcohols, the quotient of the average molecular weight of the polyoxyalkylene ethers corresponding to their molar fraction and the number of moles of the compounds to be copolymerized being 20 to 200, as demulsifiers for water containing crude oil.

20 Claims, No Drawings

USE OF COPOLYMERS OF POLYOXYALKYLENE ETHERS OF ALLYL AND/OR METHALLYL ALCOHOL AND VINYL ESTERS AS DEMULSIFIERS FOR WATER-CONTAINING CRUDE OIL

BACKGROUND OF THE INVENTION

1. Field of the Invention

The invention relates to the field of demulsifiers, and more specifically, to demulsifiers for use with crude oil.

2. Description of the Prior Art

A large portion of crude oil, when extracted from the ground, contains emulsified salt water in smaller or larger quantities. Such emulsions, which occur predominantly as water/oil emulsions, must be separated into their phases, since the salt water contained in the emulsion would interfere with the further processing of the crude oil, especially while it is being transported or distilled.

The separation of such crude oil emulsions is accomplished either by a gravity settling process, by heat treatments, centrifuging, applying electrical fields, the addition of demulsifiers, or by a combination of several of these methods.

However, the extracted crude oil emulsion are generally too stable to be broken by sedimentation, filtration, centrifuging or heating alone. On the other hand, in some cases, demulsifiers, even in small concentrations, cause the emulsion to break.

A large number of demulsifiers have already been proposed. One reason for this is that different crude oils have different compositions and demulsifiers suitable for breaking emulsions of crude oils from one source, are unsuitable for crude oil emulsions from a different location. Known demulsifiers are therefore more or less specific for particular crude oils.

As demulsifiers, alkyl sulfates and alkylaryl sulfonates as well as petroleum sulfonates have already been used in the form of their amine salts. Furthermore, addition products of ethylene oxide and suitable compounds with active hydrogen, such as, alkyl phenols, castor oil, fatty acids, fatty alcohols and aldehyde resins have been used. General information concerning these may be found, for example, in the book "Oberflächenaktive Anlagerungsprodukte des Ethylenoxids" (Surface Active Addition Products of Ethylene Oxide) by N. Schönfeld, Wissenschaftliche Verlagsgesellschaft mbH, Stuttgart, 1959, page 295.

SUMMARY OF THE INVENTION

We have discovered demulsifiers for use with crude oils, which are particularly effective and superior to the products known from the state of the art. The important parameters for the effectiveness of demulsifiers for crude oils containing water in a more or less fine dispersion, are the speed at which the crude oil is split into an aqueous and an oily phase, the completeness of the splitting (the water content of the oily phase of the oil content of the aqueous phase should be as low as possible), as well as the universal usefulness of the demulsifier for demulsifying crude oil from different sources. While it is not possible to find a demulsifier which is suitable for all types of crude oil, because the compositions of crude oil are too varied, it is an object of the invention to provide a single demulsifier which will separate the largest possible number of different types of crude oil from water.

More particularly, we have discovered that copolymers, synthesized in a particular manner, are especially suitable as demulsifiers for water-containing crude oil. Such copolymers are obtained by copolymerizing one or several polyoxyalkylene ether(s) of allyl and/or methallyl alcohol with vinyl esters of lower carboxylic acids, or mixtures of vinyl esters of lower carboxylic acids with up to 50 mole percent of esters of acrylic or methacrylic acid, or ethers of allyl or methallyl alcohol and fatty alcohols, wherein the quotient of the average molecular weight of the polyoxyalkylene ethers corresponding to their molar fraction and the number of moles of the compounds to be copolymerized is 20 to 200.

DESCRIPTION OF THE PREFERRED EMBODIMENTS

Suitable polyoxyalkylene ethers of allyl and/or methallyl alcohol include those having the formula

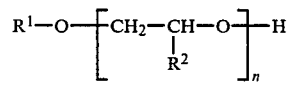

in which n is a whole number larger than 1 and, especially, not less than 5, $R^1$ is an allyl or methallyl radical, $R^2$ represents a hydrogen radical, a hydrocarbon group with 1 to 30 carbon atoms, or a halogenated hydrocarbon group with 1 to 30 carbon atoms. Suitable alkylene oxides include ethylene oxide, propylene oxide, butylene oxide, or $\alpha$-olefin oxides of long-chain hydrocarbons with up to 30 carbon atoms.

Particularly effective demulsifiers are obtained by using mixtures of different polyoxyalkylene ethers of allyl and/or methallyl alcohol for synthesizing the inventive copolymers. Especially preferred for this purpose are mixtures of polyoxyethylene and polyoxypropylene ethers of allyl and/or methallyl alcohol.

Usable as copolymerizable vinyl compound are especially those, whose alkyl groups have 1 to 4 carbon atoms, such as, vinyl acetate, vinyl propionate, vinyl butyrate, or vinyl pivalate.

Besides vinyl esters, esters of acrylic or methacrylic esters can also be copolymerized. Moreover, the esters of acrylic or methacrylic acid may be contained in an amount up to 50 mole percent, based on the vinyl compounds.

Preferably used as acrylic or methacrylic esters are their alkyl esters with 1 to 20 carbon atoms in the alkyl radical, such as, methyl acrylate, methyl methacrylate, butyl acrylate, butyl methacrylate, lauryl methacrylate or stearyl methacrylate.

It is furthermore possible to copolymerize small amounts of esters of acrylic or methacrylic acid and unsaturated alcohols, such as, allyl alcohol. However, such esters should only amount to 15 mole percent of the acrylic or methacrylic esters. By mutually linking the copolymers together during the polymerization, an increase in the molecular weight of the copolymer is achieved which leads to particularly effective products.

Instead of acrylic or methacrylic esters, allyl or methallyl ethers of fatty alcohols can also be used as comonomers. Aliphatic alcohols with 10 to 20 carbon atoms are referred to herein as fatty alcohols.

The copolymers for use in accordance with the invention may also be copolymerized with additional monomers, such as, acrylamide, methacrylamide, acrylic acid, dimethylaminoethyl acrylate or methacrylate, hydroxyethyl acrylate or methacrylate, as well as hydroxypropyl acrylate or methacrylate in amounts of up to 50 mole percent.

In an equivalent manner, the molecular weight of the compounds which are to be used inventively, can be increased by reacting these compounds with difunctional or higher functional isocyanates or with other reactive polyfunctional compounds.

When copolymerizing the polyoxyalkylene ethers of allyl and/or methallyl alcohol with vinyl esters of lower carboxylic acids or their mixtures with acrylic or methacrylic esters, high polymerization yields and, at the same time, copolymers of high molecular weight are obtained, preferably, if the amount of vinyl compounds to be copolymerized is matched to the molecular weight of the polyoxyalkylene ether used.

Inventively therefore, those copolymers should be used, whose quotient from the average molecular weight of the polyoxyalkylene ether corresponding to its molar fraction and the number of moles of compounds to be copolymerized is from about 20 to 200.

If, for example, a polyoxyalkylene ether of allyl alcohol, with a molecular weight of 1,800 is copolymerized with vinyl esters, 1,800 g of the polyether can be copolymerized with 9 to 70 moles of vinyl ester, since $$\frac{\text{molecular weight of polyether} \times \text{molar fraction}}{\text{number of moles of remaining compounds to be copolymerized}} =$$

20 to 200 (referred to as the quotient in Table 2)

$$= \frac{1800 \times 1}{9} = 200$$

or $$\frac{1800 \times 1}{90} = 20$$

Up to 50 mole percent of this amount of vinyl ester, that is, 9 to 45 mole percent in the present example, may be replaced by the methacrylate ester. Up to 15 mole percent of this amount, that is, 1.35 to 6.75 mole percent may consist of methacrylate esters of unsaturated alcohols.

If, however, the copolymerization is carried out with mixtures of polyoxyalkylene ethers of allyl or methallyl alcohol, for example, with 30 mole percent of a polyether with an average molcular weight of 1,200 and 70 mole percent of a polyether with an average molecular weight of 2,150, the range of the number of moles of vinyl compounds to be copolymerized is found to be 9 to 93, according to the quotients:

$$\frac{(1,200 \times 0.3) + (2,150 \times 0.7)}{93.25} = 20$$

and $$\frac{(1,200 \times 0.3) + (2,150 \times 0.7)}{9.325} = 200$$

Preferably, those copolymers which are soluble or dispersible in mixtures of equal parts of methanol and water are used.

The compounds used in accordance with the invention can also be combined in any manner with other known demulsifiers. They are compatible with most known demulsifiers so that their joint use creates no difficulties. They can be used particularly well with organosilicon demulsifiers, such as, those described or proposed in German Pat. Nos. 19 37 130 and 22 50 920, on German Offenlegungsschriften corresponding to patent applications Nos. P 33 25 529.6 and P 33 12 576.7.

The synthesis of compounds to be used inventively is described in patent application No. P 32 41 084.0 (U.S. Pat. No. 4,476,252).

The following examples illustrate the synthesis of the compounds to be used inventively, their composition and their properties.

EXAMPLE 1

(a)

Synthesis of an Allyl Polyetherol

Allyl alcohol (116 g, approximately 2 moles) and 21 g (approximately 0.3 moles) of potassium methylate are added to a reactor, which is then flushed carefully with nitrogen and heated to 110° C. Ethylene oxide (1,083 g, approximately 24.6 moles) is then added at such a rate, that the internal temperature and pressure of the reactor do not exceed 120° C. and 6 bar, respectively. After all of the ethylene oxide has been introduced, the temperature is maintained at 115° C., until a constant pressure indicates the end of the reaction. Residual monomers are then removed under vacuum at 80° to 90° C.

The product obtained is neutralized with phosphoric acid, the water is removed by distillation and the sodium phosphate formed is filtered off with the help of a filter aid. The hydroxyl number of the product is 94.3. Assuming a functionality of 1, this corresponds to a molecular weight of 595. The double-bond content can be calculated from the iodine number to be 89 mole percent.

(b)

Copolymerization of Allyl Polyether Monool with Vinyl Acetate

The allyl polyethylene oxide monool obtained in (a) (990 g, approximately 2 moles) is heated to 80° C. in a 3-neck flask under a blanket of nitrogen together with 886 g (approximately 0.5 moles) of a polyether. The polyether was synthesized from 58 g (approximately 1 mole) of allyl alcohol, 519 g (approximately 11.8 moles) of ethylene oxide and 1,218 g (approximately 21 moles) of propylene oxide according to the procedure of Example 1(a), 254 g (approximately 1 mole) of lauryl methacrylate and 332 g (approximately 1 mole) of stearyl methacrylate.

Vinyl acetate (860 g, approximately 10 moles), in which 26 g of azodiisobutyronitrile were dissolved, is then added uniformly over a period of 2 hours. Afterwards, 10 g amounts of azodiisobutyronitrile are added on four occasions over a period of 2 hours, the temperature being kept at 80° C. This is finally followed by a post-reaction period of a further 2 hours at the same temperature.

The remaining vinyl acetate is distilled off under vacuum. From the amount of monomer, collected in the cold trap, it follows that the polymerization yield, based on vinyl acetate, is 79% of the theoretical. From determining the iodine number, it can be concluded that approximately 81.5% of the allyl polyetherols were used up in the copolymerization. Gel chromatographic analysis shows that the numerical average molecular weight is approximately 20,000.

EXAMPLES 2 to 11

Besides the allyl polyetherols, synthesized in Example 1(a), four additional polyetherols were obtained by the procedure described above for synthesizing further copolymers based on allyl polyetherols, vinyl acetate and methacrylates. The polyetherols for this synthesis are described in Table 1, in which their ethylene oxide and propylene oxide contents and their molecular weight, determined from the hydroxyl number are given. The numerical data is based on one mole of allyl alcohol.

TABLE 1

| Polyether No. | Ethylene Oxide (moles) | Propylene Oxide (moles) | Molecular Weight OH Number |
|---|---|---|---|
| I | 5.5 | — | 295 |
| II | 12.3 | — | 595 |
| III | — | 5.9 | 380 |
| IV | — | 12.8 | 786 |
| V* | 11.8 | 21.0 | 1772 |
| VI* | 12.5 | 3.3 | 782 |

*Allyl polyether with block structure with the propylene oxide block on the allyl alcohol.

The composition of the copolymers, synthesized from the different polyethers, vinyl acetate and the methacrylates, is given in Table 2. The total amount of azodiisobutyronitrile used is approximately 1 weight percent.

TABLE 2

| Example No. | Polyether No. (moles) | | | | | | Allylmethacrylate (moles) | Vinylacetate (moles) | Laurylmethacrylate (moles) | Stearylmethacrylate (moles) | Quotient |
|---|---|---|---|---|---|---|---|---|---|---|---|
| | I | II | III | IV | V | VI | | | | | |
| 2 | 1 | 1 | — | — | 0.5 | — | — | 10 | 1 | 1 | 59 |
| 3 | 1 | 1 | — | — | 0.5 | — | — | 12 | 1 | 1 | 51 |
| 4 | 1 | 1 | — | — | 0.5 | — | — | 12 | 1 | 1 | 51 |
| 5 | 1 | 1 | — | — | 0.5 | — | — | 15 | 1 | 1 | 42 |
| 6 | 1 | 1 | — | — | 0.5 | — | 0.1 | 10 | 1 | 1 | 59 |
| 7 | 1 | 1 | — | — | 0.5 | — | 0.2 | 10 | 1 | 1 | 58 |
| 8 | 1 | 1 | — | — | 0.5 | — | — | 10 | — | 2 | 59 |
| 9 | — | 1 | — | — | 0.5 | 1.0 | — | 10 | 1 | 1 | 75 |
| 10 | 1 | 1 | 1.75 | 1.75 | — | — | — | 22 | — | — | 24 |
| 11 | 2 | — | — | — | 1.0 | — | — | 12 | 1 | 1 | 56 |

EXAMPLE 12

The copolymer from Example 3 was mixed with a dimethylsiloxane alkylene oxide block copolymer in a weight ratio of 3:1. The block copolymer is of the (AB)$_n$A type, in which A represents a polyether diol of the CDC type with a molecular weight of 1580, a polyethylene oxide block C and a polypropylene oxide block D with a 1:1 weight ratio of ethylene oxide to propylene oxide and in which B represents a dimethylsiloxane block with 15 dimethylsiloxane units.

EXAMPLE 13

The copolymer from Example 4 was mixed in a 1:1 weight ratio with an alkylene oxide block copolymer of the CDC type. This block copolymer has a molecular weight of 2,470, C representing a polyethylene oxide block and D a polypropylene oxide block, with a 1:1 weight ratio of ethylene oxide to propylene oxide.

EXAMPLES OF THE APPLICATION

The products obtained as described in Examples 1 to 13, were dissolved in a mixture of 80 parts by weight of methanol and 20 parts by weight of water to form a 50% solution. The demulsifier mixture of these solutions was tested with crude oils of different origin.

The application test was carried out using the so-called "bottle test" described in "Treating Oil Field Emulsions", ed. by the American Petroleum Institute, Dallas, Tex., 1974, page 33 ff. The amounts of water which had separated after certain times are given in volume percent in the tables; the determination was carried out according to ASTM D 96-68 (API 2542). In addition, the temperature at which the demulsification took place, the particular 50% solution used, the demulsifier, the absolute water content, the residual water content and the origin of the crude oil are given.

Demulsifiers A and B are products of the state of the art and are used for comparison. Demulsifier A is a block copolymer of about 70 weight percent propylene oxide and about 30 weight percent ethylene oxide with an average molecular weight of about 3,000.

Demulsifier B is an ethoxylated phenol-formaldehyde condensation product of the novolak type, commercially obtainable under the name of Dissolvan 4490 and is described in German Pat. No. 16 42 852.

TABLE A

Crude oil from Venezuela with an average water content of 38 volume percent. Amount of demulsifier used per 100 ml of crude oil: 60 ppm

| Product | Temperature °C. | ml Water Separated after hours | | | Residual Water % |
|---|---|---|---|---|---|
| | | 3 | 6 | 24 | |
| Blank Example | 50 | — | — | — | 38 |
| 1 | 50 | 20 | 25 | 37 | 2 |
| 2 | 50 | 10 | 15 | 38 | 1 |
| 3 | 50 | 10 | 10 | 38 | 0.5 |
| 4 | 50 | 15 | 20 | 36 | 2 |
| 5 | 50 | 15 | 30 | 38 | 1 |
| 6 | 50 | 10 | 25 | 39 | 1 |
| 7 | 50 | 10 | 25 | 36 | 3 |
| 8 | 50 | 15 | 30 | 36 | 3 |
| 9 | 50 | 15 | 25 | 38 | 0.5 |
| 10 | 50 | 20 | 25 | 39 | 0.5 |
| 11 | 50 | 15 | 30 | 36 | 2 |
| 12 | 50 | 15 | 30 | 38 | 1 |
| 13 | 50 | 15 | 30 | 36 | 2 |
| Demulsifier A | 50 | 5 | 20 | 30 | 11 |
| Demulsifier B | 50 | — | 15 | 28 | 14 |

TABLE B

Crude Oil from North Germany with an average water content of 32 volume percent. Amount of demulsifier used per 100 ml of crude oil: 50 ppm.

| Product | Temperature °C. | ml Water Separated after hours 3 | 6 | 24 | Residual Water % |
|---|---|---|---|---|---|
| Blank Example | 40 | — | — | — | 30 |
| 1 | 40 | 10 | 28 | 31 | 1 |
| 2 | 40 | 18 | 26 | 32 | 0.5 |
| 3 | 40 | 20 | 25 | 32 | 0.5 |
| 4 | 40 | 22 | 28 | 31 | 0.5 |
| 5 | 40 | 20 | 25 | 32 | 0.5 |
| 6 | 40 | 18 | 26 | 32 | 0.5 |
| 7 | 40 | 24 | 28 | 31 | 1 |
| 8 | 40 | 18 | 25 | 31 | 1 |
| 9 | 40 | 20 | 30 | 32 | 0.5 |
| 10 | 40 | 25 | 30 | 31 | 1 |
| 11 | 40 | 20 | 28 | 32 | 0.5 |
| 12 | 40 | 25 | 30 | 32 | 0.5 |
| 13 | 40 | 25 | 30 | 32 | 0.5 |
| Demulsifier A | 40 | 10 | 22 | 26 | 8 |
| Demulsifier B | 40 | 8 | 15 | 24 | 11 |

TABLE C

Crude Oil from the North Sea with an average water content of 8 volume percent. Amount of demulsifier used per 100 ml of crude oil: 30 ppm.

| Product | Temperature °C. | ml Water Separated after hours 3 | 6 | 24 | Residual Water % |
|---|---|---|---|---|---|
| Blank Example | 40 | — | — | — | 30 |
| 1 | 25 | 4 | 6 | 8 | 0.5 |
| 2 | 25 | 5 | 7 | 8 | 0.5 |
| 3 | 25 | 5 | 7 | 8 | 0.5 |
| 4 | 25 | 3 | 6 | 8 | 0.5 |
| 5 | 25 | 4 | 6 | 8 | 0.5 |
| 6 | 25 | 3 | 6 | 8 | 0.5 |
| 7 | 25 | 3 | 6 | 8 | 0.5 |
| 8 | 25 | 4 | 7 | 8 | 0.5 |
| 9 | 25 | 3 | 6 | 8 | 0.5 |
| 10 | 25 | 4 | 6 | 7 | 0.5 |
| 11 | 25 | 4 | 7 | 8 | 0.5 |
| 12 | 25 | 5 | 7 | 8 | 0.5 |
| 13 | 25 | 5 | 7 | 8 | 0.5 |
| Demulsifier A | 25 | 2 | 4 | 6 | 1 |
| Demulsifier B | 25 | 1 | 3 | 5 | 3 |

We claim:

1. A demulsifier for water-containing crude oil comprising a demulsifying effective amount of one or more copolymers obtained by copolymerizing at least one polyoxyalkylene ether of allyl alcohol or methallyl alcohol with vinyl esters of lower carboxylic acids, or mixtures of vinyl esters of lower carboxylic acids, with up to 50 mole percent of a compound selected from the group consisting of esters of acrylic or methacrylic acid, ethers of allyl or methallyl alcohol with fatty alcohols, wherein the quotient of the average molcular weight of the polyoxyalkylene ethers corresponding to their molar fraction and the number of moles of the compounds to be copolymerized is from 20 to 200.

2. The demulsifier of claim 1 wherein the polyoxyalkylene ether has the formula

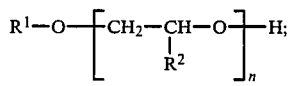

in which
n is a whole number larger than 1,
$R^1$ is an allyl or methallyl radical,
$R^2$ represents a hydrogen radical, a hydrocarbon group with 1 to 30 carbon atoms, or a halogenated hydrocarbon group with 1 to 30 carbon atoms.

3. The demulsifier of claim 2 wherein n is not less than 5.

4. The demulsifier of claim 1 wherein a mixture of different polyoxyalkylene ethers of allyl or methallyl alcohol are used for the copolymerization.

5. The demulsifier of claim 2 wherein a mixture of different polyoxyalkylene ethers of allyl or methallyl alcohol are used for the copolymerization.

6. The demulsifier of claim 1 wherein a mixture of polyolxyethylene and polyoxypropylene ethers of allyl or methallyl alcohol are used for the copolymerization.

7. The demulsifier of claim 2 wherein a mixture of polyoxethylene and polyoxypropylene ethers of allyl or methallyl alcohol are used for the copolymerization.

8. The demulsifier of claim 1 wherein alkyl group of the vinyl ester contains from 1 to 4 carbon atoms.

9. The demulsifier of claim 1 wherein alkyl esters of acrylic or methacrylic acid are used, the alkyl group containing from 1 to 10 carbon atoms.

10. The demulsifer of claim 1 wherein an ether of a fatty alcohol is used as a comonomer.

11. A method for demulsifying water containing crude oil comprising adding to said water a demulsifying effective amount of one polyoxyalkylene ether of allyl alcohol or methallyl alcohol with vinyl esters of lower carboxylic acids, or mixtures of vinyl esters of lower carboxylic acids, with up to 50 mole percent of a compound selected from the group consisting of esters of acrylic or methacrylic acid, ethers of allyl or methallyl alcohol with fatty alcohols, wherein the quotient of the average molecular weight of the polyoxyalkylene ethers corresponding to their molar fraction and the number of moles of the compounds to be copolymerized is from 20 to 200.

12. The method of claim 11 wherein the polyoxyalkylene ether has the formula

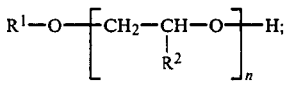

in which
n is a whole number larger than 1,
$R^1$ is an allyl or methallyl radical,
$R^2$ represents a hydrogen radical, a hydrocarbon group with 1 to 30 carbon atoms, or a halogenated hydrocarbon group with 1 to 30 carbon atoms.

13. The method of claim 12 wherein n is not less than 5.

14. The method of claim 11 wherein a mixture of different polyoxyalkylene ethers of allyl or methallyl alcohol are used for the copolymerization.

15. The method of claim 12 wherein a mixture of different polyoxyalkylene ethers of allyl or methallyl alcohol are used for the copolymerization.

16. The method of claim 11 wherein a mixture of polyoxyethylene and polyoxypropylene ethers of allyl or methallyl alcohol are used for the copolymerization.

17. The method of claim 12 wherein a mixture of polyoxyethylene and polyoxypropylene ethers of allyl or methallyl alcohol are used for the copolymerization.

18. The method of claim 11 wherein alkyl group of the vinyl ester contains from 1 to 4 carbon atoms.

19. The method of claim 11 wherein alkyl esters of acrylic or methacrylic acid are used, the alkyl group containing from 1 to 10 carbon atoms.

20. The method of claim 11 wherein an ether of a fatty alcohol is used as a comonomer.

* * * * *